Patented Oct. 6, 1953

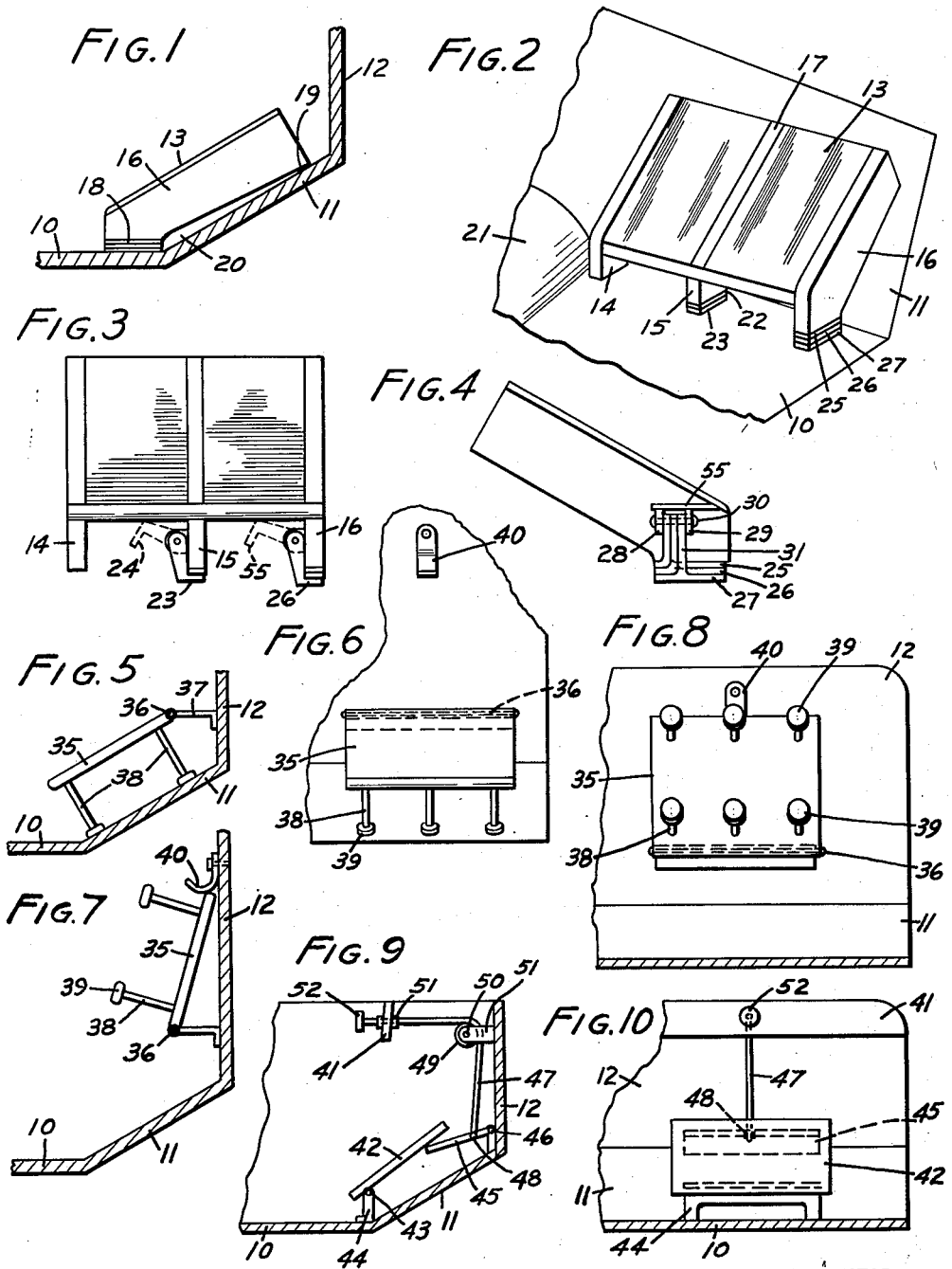

2,654,420

UNITED STATES PATENT OFFICE 2,654,420

FOOTREST

Lester R. Rogers, Butte, Mont.

Application May 21, 1951, Serial No. 227,490

2 Claims. (Cl. 155—169)

This invention relates to foot rests and particularly foot rests of the type usable by a passenger in an automobile.

The principal object of the invention is to provide a foot rest for the comfort of persons whose legs may not be long enough to reach the front or inclined portion of the floor board. Another object is to provide such a foot rest the slope of which may be adjusted to suit the convenience of the user or the shape of the floor board.

My novel construction comprises a sloping foot board provided with legs or footings adapted to hold the foot board spaced at a desired distance from the floor or front end of the seating space. A preferred feature is the provision of means to accommodate the foot rest to sloping floors of an automobile.

The invention will be better understood from the following detailed description and the accompanying drawing of which:

Fig. 1 shows a side view, partly in cross-section, of the front floor portion of the front seat space of an automobile in which there is placed a foot rest according to this invention;

Fig. 2 is an isometric view of the arrangement shown in Fig. 1;

Fig. 3 is a front view of the arrangement shown in Figs. 1 and 2;

Fig. 4 shows a detail used in the construction of Figs. 2 and 3;

Fig. 5 is a side view, partially in section, showing another embodiment of my invention;

Fig. 6 shows a front view of the arrangement of Fig. 5;

Fig. 7 is a side view, partially in section, showing the foot rest of Fig. 5 held in an unused position;

Fig. 8 shows a front view of the arrangement of Fig. 7;

Fig. 9 is a side view, partially in section, showing another modification according to my invention; and Fig. 10 shows a front view of the arrangement according to Fig. 9.

Referring to the embodiment of Figs. 1 to 4 in the drawing, there is shown part of the forward passenger section of an automobile at the right of the driver's seat. This includes the floor 10, the inclined toeboard 11 near the front of the compartment and the vertical cowl 12 which extends up to a position back of the dashboard. The foot rest comprises a plate or platform 13 mounted on three footing members 14, 15 and 16. The side footings 14 and 16 may be strips of wood or the like suitably fastened to the side edges of the platform 13; and the center footing 15 may be a similar strip fitted to the under side of the platform 13. The surface of platform 13 may if desired be covered with rubber sheeting or the like and held at the center by a thin strip 17.

As shown in Fig. 1, the footings 14, 15 and 16 are shaped so that the bottom 18 of each footing will rest substantially flat on the floorboard 10 (except as the shims mentioned below, are placed therebetween) and the upper point or corner 19 of each footing will rest on the incline 11, thereby leaving a slight space 20 under most of the length of the footing and the floor portion 11. This enables the footing to find its own proper position at which it firmly rests.

In present day automobiles, the floor generally slopes down to the sides of the vehicle from a raised central portion which runs longitudinally along the center of the car; and for this reason the footings would not ordinarily all rest flat on the floor when the foot rest is placed in its proper position. Instead, if each footing should extend for the same distance below the bottom of the foot rest there would be spaces between each footing and the floor excepting the footing nearest the center which would rest on the floor. In accordance with the arrangement shown, means is provided for filling these spaces. The means comprises an arrangement of shims which can be moved into or out of position as needed. On the central footing 15 there are shown three shims 22, 23 and 24; and on the righthand footing 16, there are shown four shims 25, 26, 27 and 56. For the purpose of holding the shims, one side of each footing is provided with a pair of members 28 and 29 having through them a pin 30 on which there are pivoted the arms 31 carrying the respective shims at their ends. The arrangement is such that the shim arms can be pivoted upwardly as shown at 24 and 55 and thus removed from under the footings; and when desired they can be pivoted downwardly to be placed in position under the footings. In this way any desired number of shims can be placed under the footings 15 and 16 and thus compensate for the slope of the flooring.

Figs. 5, 6 and 7 show another embodiment of the invention in which the foot rest may be itself pivoted upwardly and out of the way when desired. For this purpose the platform 35 of the foot rest is hinged at its upper edge to a hinge 36 attached to a bracket 37 fastened to the vertical cowl wall 12 of the automobile. A number of legs 38 are attached to the under side of the platform and provided with footings 39 adapted to rest on the slanting toe board 11. These legs are of the proper length to hold the platform at the desired distance in front of the board 11.

When it is desired to move the foot rest out of use it is pivoted on the hinge 36 to an upward position as shown in Fig. 7 and snapped under a spring retainer 40 secured to the wall 12.

Figs. 9 and 10 show a further modification of a foot rest according to my invention. In this arrangement the incline of the foot rest is adjustable from the dashboard 41 of the car. The foot rest platform 42 is hinged near its lower end to a hinge 43 mounted on a bracket or footing 44 supported from the floor. Beneath the upper end of the platform 42 there is provided a board 45 hinged at 46 to a support attached to the member 12 of the vehicle. A flexible wire or lead 47 is fastened at 48 to the board 45 and carried up over a pulley wheel 49 freely rotatable on a pin 50 held in a bracket 51 mounted on member 12 back of the dashboard. From the pulley, the lead 47 is carried back through a bushing 51 through the dashboard to a handle or knob 52. By pushing or pulling the knob 52 in and out the angle of the board 45 is correspondingly varied, which varies the incline of the foot rest 42 which it supports. The friction between the lead 47 and the bushing 51 will serve to hold the board 45 in any desired position.

It should be recognized that by my invention I have provided a foot rest which is especially adapted for enhancing the comfort of persons riding in an automobile, particularly short-legged persons riding in the front seat next to a long-legged driver. The construction of my foot rest enables it to maintain a satisfactory foot area and also to maintain substantially the same incline as is originally built into the toeboard of the automobile for comfortable riding. In this respect, my foot rest is an advantage over other types which have been proposed which do not maintain the same desired incline. It will be recognized that my foot rest units can be made of suitable material such as plastic, aluminum or pressed steel. If desired, particularly in the case of metal models, the surface may be covered with rubber matting or the like.

It will be further understood that the foot rest can be made in a number of different thicknesses providing different distances from the toeboard. For example, a model may be made giving a distance of about two inches from the toeboard, another of about four inches and another of about six inches. These different dimensions should provide a desired range of distances.

I claim:

1. A foot rest adapted to be placed at the floor and toeboard of an automobile wherein the floor slopes downward from the center toward the side of the automobile, said foot-rest comprising a platform and a plurality of footing means attached beneath the platform and supporting the platform at a position substantially parallel and spaced from the toeboard, one of said footing means being nearer to the side of the automobile than another, and shim means connected with said last mentioned footing means, said shim means comprising a plurality of shims each of which is mounted on an arm pivoted to said last mentioned footing means and adapted to be swung into and out of position beneath said last-mentioned footing means, the arms being arranged so that when a plurality of the shims are swung into position beneath the footing means the shims are located one under another.

2. A foot rest adapted to be placed at the floor and toeboard of an automobile wherein the floor slopes downward from the center toward the side of the automobile, said foot rest comprising a platform and a plurality of footing means attached beneath the platform and supporting the platform at a position substantially parallel and spaced from the toeboard, one of said footing means being nearer to the side of the automobile than another, and shim means connected with said footing means which is nearer to the side, providing a shim between the bottom of the last-mentioned footing means and the floor, said shim means comprising a plurality of shims each of which is mounted on an arm pivoted to the footing and adapted to be swung into and out of position beneath the footing.

LESTER R. ROGERS.

References Cited in the file of this patent

UNITED STATES PATENTS

| Number | Name | Date |
|---|---|---|
| 807,831 | Leslie | Dec. 19, 1905 |
| 1,123,960 | Von Der Lin | Jan. 5, 1915 |
| 1,301,426 | Garvey | Apr. 22, 1919 |
| 2,032,157 | Van Dresser | Feb. 25, 1936 |
| 2,283,600 | Dodson | May 19, 1942 |
| 2,341,080 | Burkholder | Feb. 8, 1944 |
| 2,380,118 | Martz | July 10, 1945 |

FOREIGN PATENTS

| Number | Country | Date |
|---|---|---|
| 394,848 | Great Britain | July 6, 1933 |
| 645,932 | France | July 9, 1928 |